United States Patent [19]
Oliver

[11] 3,727,954
[45] Apr. 17, 1973

[54] METHOD AND APPARATUS FOR CONNECTING AN UNDERWATER PIPELINE TO A PLATFORM

[75] Inventor: John P. Oliver, Houston, Tex.

[73] Assignee: Cameron Iron Works, Inc., Houston, Tex.

[22] Filed: Aug. 2, 1971

[21] Appl. No.: 168,045

[52] U.S. Cl. ..................285/168, 61/72.1, 61/72.3, 64/6, 166/.5, 285/263, 285/282
[51] Int. Cl..........F16l 27/00, F16l 27/04, F16l 1/00
[58] Field of Search..............................61/72.3, 72.1; 166/.5, .6; 285/167, 168, 166, 163, 223, 263, 282, 272; 64/6, 7

[56] References Cited

UNITED STATES PATENTS

| | | | |
|---|---|---|---|
| 1,824,792 | 9/1931 | Reure | 285/282 X |
| 1,938,829 | 12/1933 | Hamer | 285/168 X |
| 3,219,119 | 11/1965 | Matthews, Jr. | 61/72.3 X |

Primary Examiner—Jacob Shapiro
Attorney—W. F. Hyer et al.

[57] ABSTRACT

A rigid riser pipe section is connected to the end of an underwater pipeline by an articulated pipe section which permits the riser pipe section to be laid with the pipeline along the underwater level and then raised to connection along the length of a supporting leg of a platform.

1 Claim, 4 Drawing Figures

PATENTED APR 17 1973 3,727,954
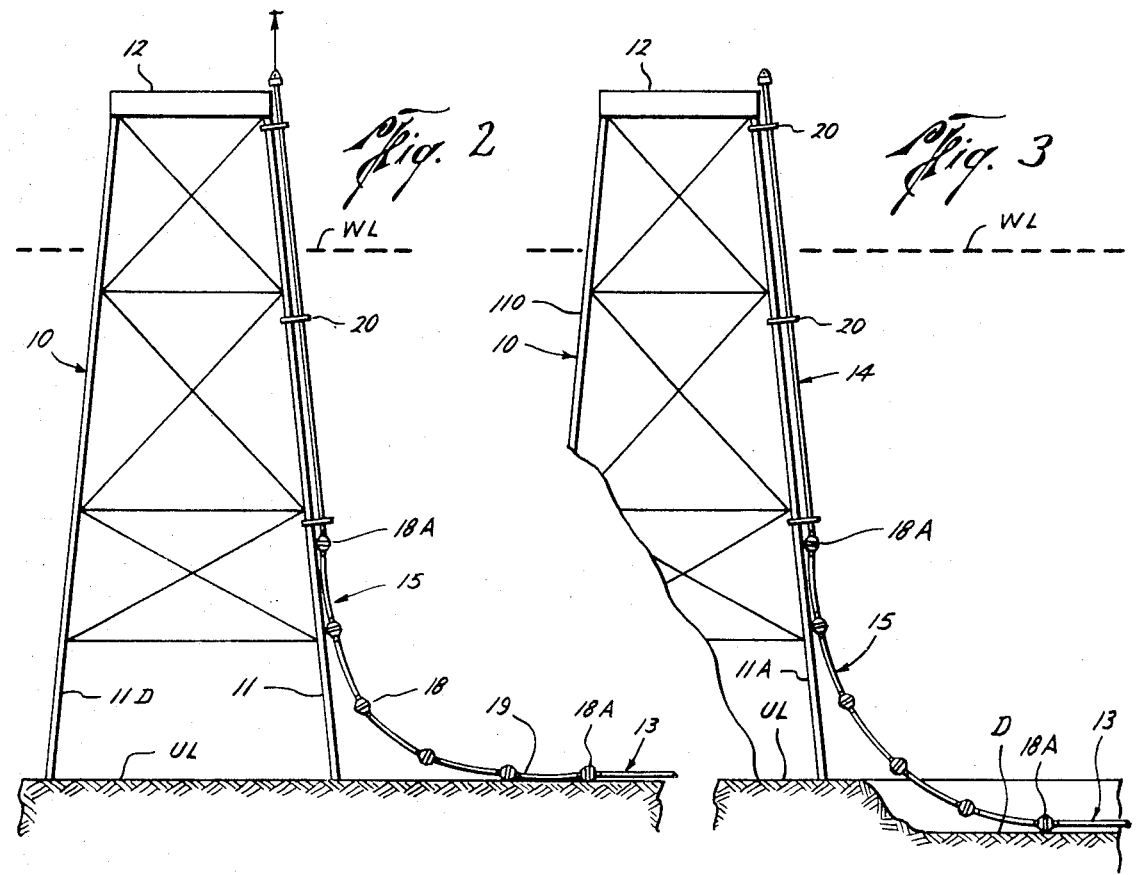
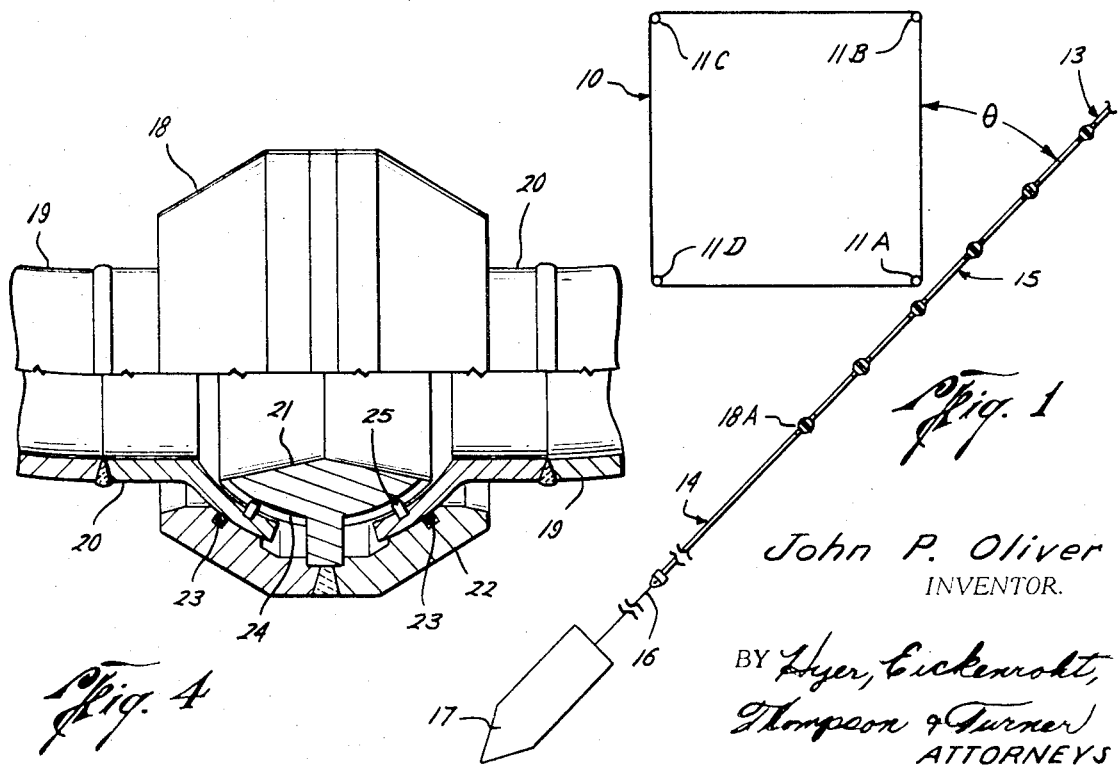
John P. Oliver
INVENTOR.
BY Hyer, Eickenroht,
Thompson & Turner
ATTORNEYS

METHOD AND APPARATUS FOR CONNECTING AN UNDERWATER PIPELINE TO A PLATFORM

This invention relates to method and apparatus for connecting one end of a generally horizontally extending underwater pipeline to a platform by means of a rigid riser pipe section adapted to be connected along the length of a supporting leg of the platform.

Methods and apparatus of this general type are shown in U.S. Pat. Nos. 3,219,119 and 3,466,882. In the latter of these two patents, the riser pipe section is connected to the end of the pipeline and laid therewith along the underwater level to one side of the platform, and then raised into position for connection to the platform leg. This invention relates to improvements in methods and apparatus of this latter type, which are preferred by many operators.

As well known in the art, the platform has a deck on which the wellhead of one or more oil or gas wells may be mounted, and fluid connection of the riser pipe section to the wellhead enables production from the wells to be flowed to the shoreline or some other distant point. Whether the platform is used for this or other purposes, the riser pipe section is connected along the length of the platform leg, with its upper end preferably above water level on a level near that of the deck, thereby obviating the need for divers in making the fluid connection.

In the aforementioned U.S. Pat. No. 3,466,882 a portion of the pipeline near the riser pipe section is engaged with a shoe at the lower end of the leg of the platform so as to bend the pipeline about the shoe as the riser pipe section is raised to a position along the length of the leg. As distinguished from other methods and apparatus of this type, wherein the pipeline is laid up to the platform, this avoids the use of divers in connecting the lower end of the riser pipe section to the pipeline.

However, inasmuch as the angle of approach and distance of the pipeline with respect to the leg of the platform cannot be predicted with any great degree of accuracy, the procedure of this prior patent may nevertheless place undue stresses and strains on the pipeline as it is pulled into place for bending about the shoe at the lower end of the platform leg. Furthermore, engagement of the pipeline with the shoe restrains its shifting with respect to the riser pipe section after the connection of the latter to the leg of the platform, which shifting may be desirable to prevent further stresses and strains due to ocean currents and movement of the earth at the underwater level, or to permit the pipeline to be buried beneath the underwater level, as by jetting of the mud from beneath it.

An object of this invention is to provide a method and apparatus which not only avoids the use of divers, but also minimizes any such stresses and strains and, more particularly, compensates for movement of the pipeline with respect to the riser pipe section.

A further object is to provide apparatus of the type described in the foregoing object which is of inexpensive construction in that it employs a minimum of moving parts, and which is easy to handle during connection of the riser pipe section to the platform leg.

These and other objects are accomplished, in accordance with the illustrated embodiment of the present invention, by apparatus in which the riser pipe section is connected to the end of the pipeline by an articulated pipe section which includes a plurality of swivel joints which enable relative rotational and angular movement between said articulated pipe section and each of the riser pipe section and pipeline. Thus, in the use of such apparatus, the end of the pipeline, the articulated pipe section and the riser are connected and laid along the underwater level with the articulated pipe section nearest the leg of the platform to which the riser pipe section is to be connected. The riser pipe section is then raised to a position along the length of the leg in which its lower end is above the underwater level and in which there is sufficient slack in the articulated pipe section to permit the end of the pipeline to move relative to the lower end of the riser pipe section. When so positioned, the riser pipe section is connected to the leg with the assurance that there will be only minor if any stresses or strains in the pipeline due to the movement of its end in any direction relative to the riser pipe section, at least within the range of the slack in the articulated pipe section.

In the preferred embodiment of the invention, the articulated pipe section also includes bent pipes between adjacent swivel joints, with the bent pipes and swivel joints being fixed against rotational movement and for angular movement relative to one another in only the plane in which the pipes are bent. Thus, during towing of the articulated pipe section into place along the side of the platform leg, all bent pipe sections will tend to assume vertical positions, and will further tend to remain in positions in planar alignment with one another as the riser pipe section is swung into position along the length of the platform leg, thereby giving the operator better control over manipulation of the articulated pipe section.

In the drawings, wherein like reference characters are used throughout to designate like parts:

FIG. 1 is a top plan view of the platform and the articulated pipe section towed into position along the side of one leg thereof;

FIG. 2 is an elevational view of the side of the platform, with the riser pipe raised into connected position along the length of the leg of the platform;

FIG. 3 is a view similar to FIG. 2, but upon jetting of the underwater level beneath a portion of the articulated pipe section and the pipeline to permit them move downwardly into a trench for subsequent burying; and FIG. 4 is an enlarged cross-sectional view of one of the intermediate swivel joints of the articulated pipe section.

With reference to the details of the abovedescribed drawings, a platform 10 is shown in each of FIGS. 2 and 3 to be supported above an underwater level UL by means of substantially upright legs 11A, 11B, 11C and 11D. With the platform so supported, a deck 12 at its upper end is disposed above the water level WL. As previously described, one or more wellheads may be mounted on the deck, although, for the sake of simplicity, they are not shown in the drawings.

As shown in FIG. 1, the end of a pipeline 13 is connected to a rigid riser pipe section 14 by means of an articulated pipe section 15, and the free end of the riser pipe section is connected by a tow line 16 to the tow barge 17 or other vessel so as to permit them to be towed into a position to one side of the platform. During this time, of course, the various sections are held in tension by the cable 16, with the trailing portion dragging along the underwater level. When towed to the position shown in FIG. 1, wherein the articulated pipe section is nearest the leg 11A to which the riser pipe section is to be connected, the free end of the riser pipe section may be lowered to the underwater level UL.

As indicated in FIG. 1, the articulated pipe section 15, when so laid, extends at an angle theta with respect to the leg 11A. As previously mentioned, it is impossible to predict with any great degree of accuracy either the extent of this angle or the distance from the leg to the articulated pipe section, and although the distance is relatively short in FIG. 1, it may instead be of considerable extent. However, the operator is able to predict the approximate distance from the end of the pipeline 13 to the platform 10, and thus the leg 11A, so he can provide an articulated pipe section 15 of sufficient length to permit its disposal in the position shown.

In such position, the leg 11A is generally opposite the mid portion of the articulated pipe section so that when the riser pipe section 14 is connected to the platform leg, as shown in FIGS. 2 and 3, the lower end of the the riser pipe section is above the underwater level. Still further, as shown in FIG. 2, there is sufficient slack in the articulated pipe section 15 to permit the pipeline 13 and the adjacent portion of section 15 to move downwardly from the underwater level UL into a ditch D, as shown in FIG. 3, which may later be jetted to permit the line to be buried. Also, of course, the slack may permit other movements of the pipeline relative to the platform, such as in a direction axially of the pipeline and away from the platform, laterally along the underwater level, either toward or away from the platform.

Thus, as previously described and as shown in the drawings, the articulated pipeline section 15 includes a plurality of intermediate and endmost swivel joints 18 and 18A, respectively, which enable relative rotational and angular movement between the articulated pipeline section and each of the riser pipe section 14 and the pipeline 13. More particularly, the articulated pipe section also includes a bent pipe 19 intermediate adjacent pairs of swivel joints, with each bent pipe being curved to a radius substantially equal to the minimum radius to which the ends of each of the swivel joints may be angled with respect to one another. In the illustrated embodiment of the invention, the endmost swivel joints 18A are connected to each of the riser pipe section and the end of the pipeline 13 for rotation and angular movement with respect to one another, and the intermediate swivels are fixed against rotational movement and for angular movement relative to the bent pipes 19 in only the plane in which the pipes are bent.

Thus, as will be apparent from FIG. 1, with tension applied to the riser pipe section, and thus the articulated pipe section, each of the bent pipes 19 tends to assume a vertical position — i.e., with its bend arranged in a generally vertical plane — as they are towed into the position of FIG. 1. Then, when the free end of the riser pipe section is disconnected from the tow line 16 and raised to the position of FIG. 2 by suitable apparatus, which may be on the lay barge, or on the platform, or both, the outer ends of the endmost swivels A permit the necessary rotational and angular adjustment without stress or strain on the pipeline.

When the riser pipe section is so positioned, it is connected along the length of the leg by means of brackets 20 of suitable construction, with its upper end above the water level WL near the deck 12 in position for fluid connection to wellheads or other parts thereon without the use of divers. The connection of the swivels to the bent pipes maintains them in planar alignment as shown in FIG. 2, which makes the articulated pipe section more maneuverable and facilitates its bending from the slack position of FIG. 2 to the position of FIG. 3.

As shown in FIG. 4, each intermediate swivel 18 is of the double-ended type in that it has a pair of tubular ends 20 which are movable with respect to an intermediate ball-shaped element 21. The ends and elements 21 are carried by an outer housing 22 in such a manner as to permit each end to be angled with respect to the element and the housing. Thus, as shown, the element is fixed to the housing and the inner end of each tubular end 20 is cup-shaped for sliding between the element and the outer housing 22. A seal ring 23 carried on the inner side of the ball of the housing seals between it and each tubular end as the latter is angled between its extreme position.

As shown in FIG. 4, the swivel is in a neutral position in which the axes of the tubular ends 20 are aligned. However, as will be appreciated from FIG. 4, each tubular member may be swung in either direction about the center of the ball-shaped element 21, so that in one extreme position, the tubular members form an upwardly divergent angle, and in another extreme position, they form a downwardly divergent angle. The limits of angling are, of course, defined by the engagement of the ends 20 with the ends of the housing 22, so that the maximum angling in either direction is the same.

As previously described, the radius of the bend in each pipe 19 is substantially equal to the maximum angling of the ends of each swivel joint with respect to one another. Thus, more bend in the pipes would be less preferable when the articulated pipe section 15 is bent to its maximum extent, as shown in FIG. 3, wherein the pipes and swivel joints provide a continuous curve to the radius of the pipes.

In the intermediate swivel joints 18, there are pins 25 on the cup-shaped portions of the tubular ends 20 for sliding within slots 24 of ball-shaped element 21. This, of course, prevents rotation of either end about its axis relative to the other end of the joint. The endmost swivel joints 18A are identical with the joints 18 except that there are no pins 25 and slots 24. Hence, the outer end is free to rotate with respect to the inner end, for purposes previously described.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for connecting one end of an underwater pipeline to a platform having a leg extending upwardly from the underwater level, comprising a rigid riser pipe section adapted to be connected along the length of said leg to dispose one end thereof above the other, and an articulated pipe section connected at one end to the lower end of the riser pipe section and adapted to be connected at its other end to the one end of the pipeline, the articulated pipe section including a plurality of swivel joints and a bent pipe between adjacent pairs of swivel joints, the swivel joint at the one end of the articulated pipe secton including means enabling angular and rotational movement between the bent pipe and the riser pipe section to which it is connected, the swivel joint at the other end of the articulated pipe section including means enabling angular and rotational movement between the bent pipe and the end of the pipeline to which it is connected, each intermediate swivel joint including means enabling angular movement and preventing rotational movement between the bent pipes to which it is connected, and each bent pipe being curved to a radius substantially equal to the minimum radius to which the ends of the swivel joints may be angled with respect to one another.

* * * * *